Figure 1:
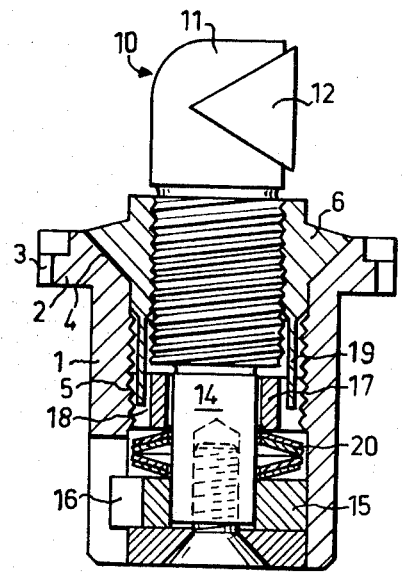

United States Patent [19]
Hedberg

[11] 3,741,672
[45] June 26, 1973

[54] ADJUSTABLE TOOL HOLDER
[76] Inventor: Nils Rune Hedberg, Villavagen 11, 76200 Rimbo, Sweden
[22] Filed: July 29, 1971
[21] Appl. No.: 167,150

[52] U.S. Cl............. 408/146, 408/153, 408/155, 408/181
[51] Int. Cl............................ B23b 29/02
[58] Field of Search............ 408/146, 153, 155, 408/181, 198

[56] References Cited
UNITED STATES PATENTS
3,434,376  3/1969  Benjamin.................. 408/153
3,347,115  10/1967 Koch....................... 408/146
3,400,616  9/1968  Mihic...................... 408/146
3,447,403  6/1969  Vogel, Sr. et al........... 408/146

Primary Examiner—Andrew R. Juhasz
Assistant Examiner—Z. R. Bilinsky
Attorney—Irvin S. Thompson and Robert J. Patch

[57] ABSTRACT

The present invention concerns an adjustment tool holder in which a tool carrier is threaded into a rotatable, but axially stationary adjustment sleeve and is displaced by rotation of said sleeve. A spring means compensating the unavoidable clearance of the threads is active between a shoulder of said carrier and a disc arranged in the support for the tool holder in such a way, that the adjustment sleeve upon turning causes such a displacement of the disc, that the spacing thereof from said shoulder is unaltered, whereby the force of the spring means remains constant.

9 Claims, 4 Drawing Figures

ADJUSTABLE TOOL HOLDER

The present invention concerns an adjustable tool holder to be mounted in a tool support, for instance a boring bar.

Tool holders of such kind are previously known and are mainly of two different types.

After the adjustment of a tool holder of the first type a locking screw at the rear end of the tool carrier is tightened to lock the tool carrier in the desired position. Since the material used for the various members of the tool holder has a certain degree of resiliency, the exact position of the tool after the tightening of the locking screw will depend on how hard said screw is tightened, and an exact positioning of the tool is therefore impossible.

In the other type of adjustable tool holder spring means are arranged instead of the locking screw to compensate for the unavoidable play in the threads. However, in the known tool holders the force of said spring means varies when the tool carrier is displaced relatively to said tool support, and said variation of the spring force is detrimental to the accuracy of the adjustment. If the adjustment is to be performed with the least possible change of the spring force, the adjustment range becomes very limited.

Furthermore, adjustable tool holders are known in which the thread play is compensated by means of a split nut, the parts of which are urged apart by means of a spring, and it has also been suggested to form the male threaded part in two pieces which are forced apart by aid of resilient means. This method results in a relatively complicated construction including an increased number of members which materially add to the costs of manufacture especially in view of the high degree of exactness required.

The main object of the present invention is to provide an adjustable tool holder by which the above stated disadvantages are removed and which is relatively inexpensive to manufacture and comprises a minimum of separate parts.

According to the invention this is achieved by a tool holder in which a tool carrier by means of a stem having a male thread extends through an adjustment sleeve and engages a female thread therein, which sleeve is rotatably but axially non-displaceably accommodated in a bore of said tool support, the protruding end of said tool carrier stem being rigidly connected to a washer which is axially displaceably but non-rotatably guided in said bore, whereby a spring means is tensioned between said washer and a disc provided with a male thread cooperating with a female thread in the tool support bore having the same pitch as the female thread of said adjustment sleeve, said disc furthermore being connected to said sleeve over connecting means for rotating therewith.

When the adjustment sleeve of the invention is turned for displacement of the tool, the tool carrier is axially moved a distance outwardly or inwardly in dependence of the direction of the sleeve rotation. Said movement is due to the engagement between the female sleeve thread and the male stem thread. The washer at the end of the tool carrier stem is thereby displaced an equal distance. By means of the connecting means the disc rotates together with the adjustment sleeve, and on account of the cooperating male and female threads of said disc and the bore, respectively, having the same pitch as the aforementioned threads said disc travels the same distance and in the same direction as said washer. The spacing between the abutment faces for the spring means will thus remain constant, wherefore the force of said spring means also remains constant.

Figure 3:
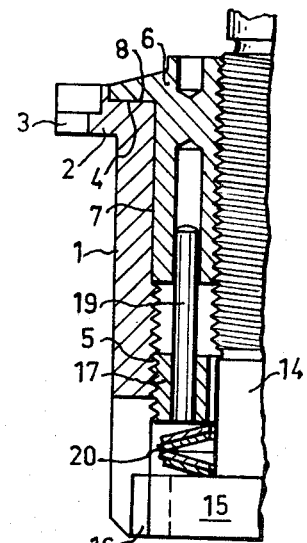
Figure 2:
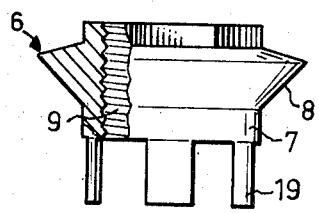
Figure 4:
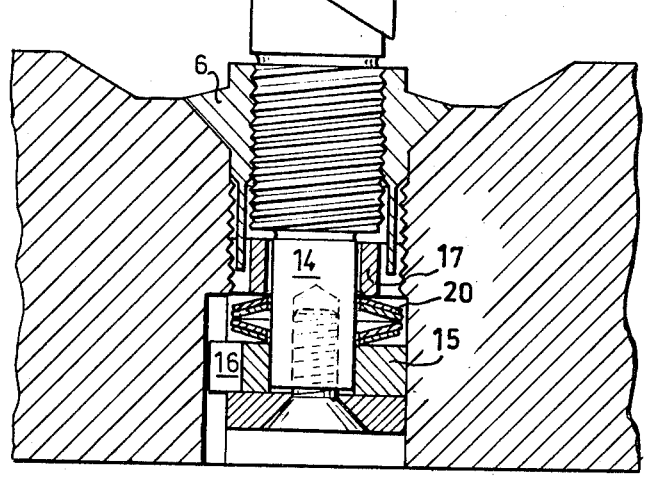

Some embodiments of the invention will now be described with reference to the accompanying drawing, in which FIG. 1 is a view in axial section of a first embodiment, FIG. 2 is an elevation partly in section of the adjustment sleeve of said embodiment, FIGS. 3 and 4 are views similar to FIG. 1 showing a second and third embodiment, respectively. Members having the same function in the different embodiments have been designated with the same reference numerals in all Figures.

The tool holder according to the embodiment shown in FIG. 1 comprises an outer cylindrical case 1 provided with a radial flange 2 at one end thereof, said flange having the holes or slots 3 for screws, by means of which the case 1 is fastened to a tool support, for instance a boring bar, with a cylindrical part thereof accommodated in a recess in said support.

The one outer end of a cylindrical throughbore in the case 1 is formed with a conical bearing surface 4 and an intermediate portion of the throughbore is provided with a female thread 5. At the other end said throughbore has a smooth wall and is of a diameter slightly greater than the root diameter of said thread 5.

An adjustment sleeve 6 comprising a cylindrical portion 7 and a peripheral flange having a conical side face 8 is accommodated in the first-mentioned end of said throughbore in such a way, that said cylindrical portion 7 extends into said bore and said conical side face 8 engages the conical bearing face 4 at the end of the bore. Thus, said adjustment sleeve 6 can be freely rotated in the case 1, but cannot move axially relatively to same.

The adjusment sleeve 6 is provided with a female thread 9. A tool carrier 10 comprising a head 11 for supporting the tool 12 and a cylindrical stem 14 having a male thread is screwed into the femal thread 9 of said adjustment sleeve 6, so that an end portion of said stem 14 extends outside of the adjustment sleeve 6. A washer or plate 15 is rigidly attached to the outer end of the stem 14 and has such a contour, as to be axially slidable in the unthreaded end portion of the throughbore. The rigid attachment of the washer 15 may be achieved by means of a non-circular end portion of the stem 14 which extends into a corresponding opening in said washer which is retained by means of a stop washer and a screw threaded into said stem. The washer 15 is guided in the throughbore in such a way that it can move axially thereto, but is prevented from rotating therein for instance by means of a key guide 16.

A cylindrical disc 17 having a central hole for the passage of the stem 14 and a male thread is arranged in engagement with the female thread portion 5 of the throughbore. The disc 17 is furthermore provided with a number of axial grooves 18 on the periphery thereof. Said grooves 18 are meant to accommodate connecting means in the form of dogs 19 integral with the adjustment sleeve 6 at the end surface of its cylindrical portion 7. Thus, the disc 17 will rotate together with the adjustment sleeve 6, when same is turned in the throughbore. To facilitate said turning the adjustment sleeve is provided with a hexagonal head or other means for wrenching.

A set of spring washers 20 are inserted between the washer 15 at the end of the tool carrier 14 and the disc 17 in engagement with the end surfaces thereof facing each other. When the tool older is assembled the distance between said end surfaces is chosen in such a way that the set of spring washers 20 is pretensioned to a desired degree to compensate for the clearance in the threads. Said set of spring washers may be replaced by some other spring means, such as a number of coil springs or a body of a suitable resilient, non-metallic material.

When the tool carrier is to be adjusted, the adjustment sleeve 6 is turned in the appropriate direction so that the carrier is moved outwardly or inwardly under the action of the cooperating threads of said sleeve 6 and the stem 14. The disc 17 is rotated simultaneously with the adjustment sleeve 6 by the connecting means 19 and, due to the cooperation between the thread of the disc and the thread in the throughbore, which threads have the same pitch as the aforementioned threads but are threaded in opposite direction thereto, the disc 17 is displaced in the same direction and the same distance as the tool carrier 10 and, consequently, the washer 15. The distance between the adjacent end faces of said disc 17 and said washer 15 remains therefore unaltered and the force of the spring washers 20 is thus constant.

The embodqment shown in FIG. 3 differs from the above described embodiment only with respect to details. The bearing surface 4 at the end of the throughbore in the case 1 and the cooperating side surface 8 of the adjustment sleeve flange extend perpendicularly to the axis of said bore. The connecting means 19 between the disc 17 and the adjustment sleeve 6 are rigidly secured in said disc and extend into borings in the sleeve 6, in which they are axially slidable. The washer 15 at the end of the tool carrier stem 14 forms furthermore an integral part of said stem 14.

The only difference between the embodiment of FIG. 1 and that of FIG. 3 resides in the fact that the case 1 is omitted in the last mentioned embodiment and the adjustment sleeve 6 together with the other parts of the tool holder, is inserted in a bore in the tool support itself. Said bore has the same form as the bore in the case 1 of the embodiment according to FIG. 1.

The adjustable tool holder described above fulfills therefore the requirements stated in the introduction to this description, but the described embodiments must only be regarded as examples without any limiting effect, since many modifications are possible within the scope set forth in the accompanying claims.

What I claim is:

1. An adjustable tool holder comprising a tool support, an adjustment sleeve rotatably but axially nondisplaceably disposed in a bore of said tool support, a tool carrier stem having a male thread in screw-threaded engagement with a female thread in said adjustment sleeve, said tool carrier stem having a protruding end, a washer carried by said protruding end for axial movement in said bore, means preventing rotation of said washer in said bore, a disc having a male thread in screw-threaded engagement with a female thread on said tool support on the interior of said bore, means preventing relative rotation between said disc and said adjustment sleeve but permitting relative axial movement between said disc and said adjustment sleeve, the last-mentioned thread having the same pitch but the opposite hand as said first-mentioned thread, whereby said disc and said stem upon rotation of said adjustment sleeve are displaced axially relative to said tool support by the same distance and in the same direction so that the gap between said disc and said washer and thus the tension of said spring means remains substantially constant.

2. An adjustable tool holder as claimed in claim 1, characterized in that said adjustment sleeve is provided with a peripheral flange having a side face in engagement with a bearing surface at the outer end of said tool support bore.

3. An adjustable tool holder as claimed in claim 2, characterized in that said side face of the flange and said bearing surface are of a corresponding conical form.

4. An adjustable tool holder as claimed in claim 2, characterized in that said side surface of the flange and said bearing surface are substantially perpendicular to the axis of said bore.

5. An adjustable tool holder as claimed in claim 1, characterized in that connecting means are provided between said adjustment sleeve and said disc which are rigidly attached to one of said members and slidably accommodated in grooves in the other member.

6. An adjustable tool holder as claimed in claim 1, characterized in that said washer is prevented from rotation in said tool support bore by means of a key slot and a key slidable therein.

7. An adjustable tool holder as claimed in claim 1, characterized in that said washer is formed by a collar integral with the end of the tool carrier stem.

8. An adjustable tool holder as claimed in claim 1, characterized in that said spring means comprises a stack of spring washers.

9. An adjustable tool holder as claimed in claim 1, characterized in that said tool support bore is arranged in a case which is inserted in a cavity of said tool support and locked therein.

* * * * *